United States Patent [19]

Taylor

[11] Patent Number: 4,821,019

[45] Date of Patent: Apr. 11, 1989

[54] MIRROR ASSEMBLY INCLUDING AN IMAGE FORMING LAMP

[76] Inventor: Keith H. Taylor, 8140 Dubay, Detroit, Mich. 48234

[21] Appl. No.: 211,082

[22] Filed: Jun. 21, 1988

Related U.S. Application Data

[63] Continuation of Ser. No. 1,575, Jan. 8, 1987, abandoned.

[51] Int. Cl.⁴ .............................................. B60Q 1/32
[52] U.S. Cl. ..................................... 362/83.1; 362/80
[58] Field of Search .................... 340/98, 103; 362/80; 40/544, 556

[56] References Cited

U.S. PATENT DOCUMENTS

| | | | |
|---|---|---|---|
| 1,608,548 | 11/1926 | Costello | 340/103 |
| 1,954,740 | 4/1934 | Marshall | 340/103 |
| 3,680,237 | 8/1972 | Finnerty, Sr. | 40/544 |

FOREIGN PATENT DOCUMENTS

| | | | |
|---|---|---|---|
| 258975 | 10/1926 | United Kingdom | 340/98 |
| 271917 | 6/1927 | United Kingdom | 340/98 |
| 289164 | 4/1928 | United Kingdom | 340/98 |
| 396789 | 8/1933 | United Kingdom | 340/98 |
| 1210061 | 10/1970 | United Kingdom | 340/98 |

Primary Examiner—Joseph A. Orsino
Assistant Examiner—Brian Tumm
Attorney, Agent, or Firm—Reising, Ethington, Barnard, Perry & Milton

[57] ABSTRACT

A mirror assembly (10) including a housing (12) having a translucent portion, mirror mechanism (20) retained by the housing (12), and an illuminating image forming mechanism (26) mounted within the housing (12) and behind the mirror mechanism (20) for projecting an image through the translucent portion.

7 Claims, 1 Drawing Sheet

U.S. Patent  Apr. 11, 1989  4,821,019
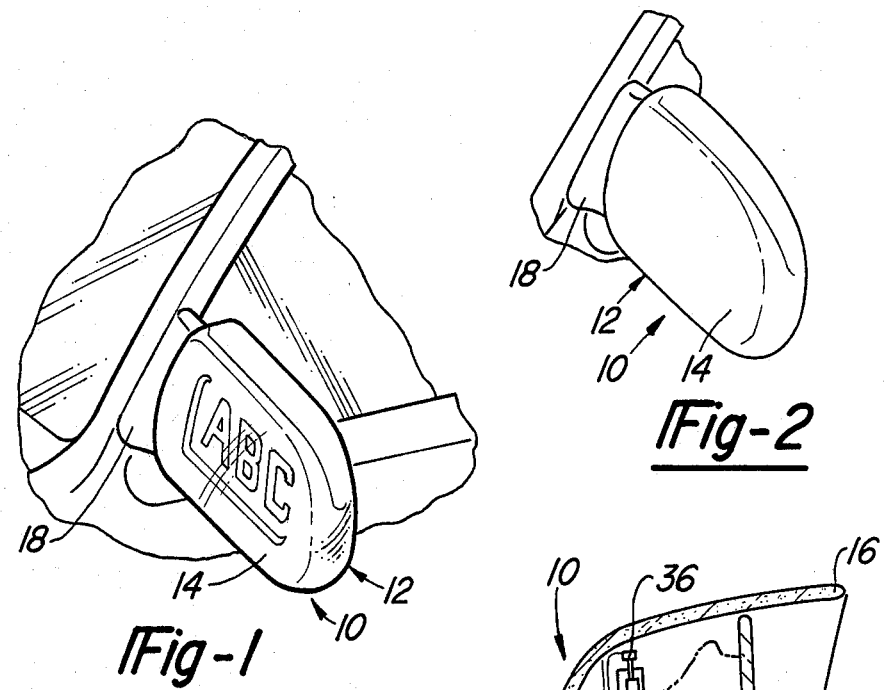
*Fig-1*
*Fig-2*
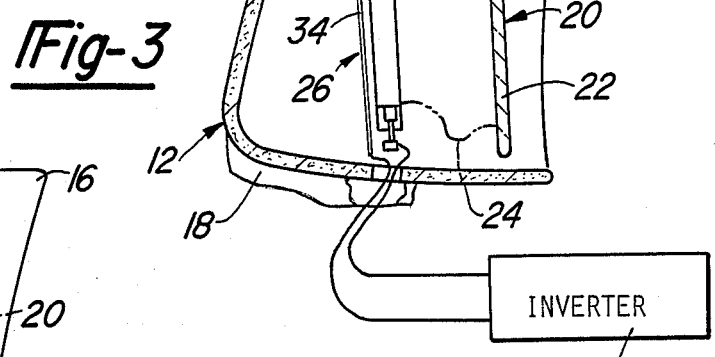
*Fig-3*
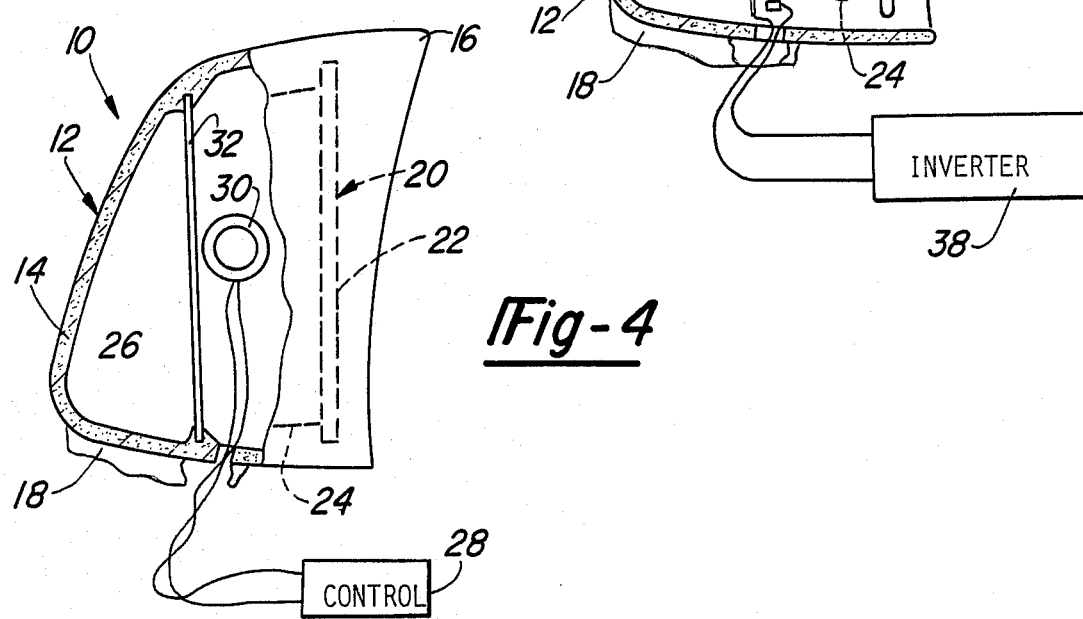
*Fig-4*

MIRROR ASSEMBLY INCLUDING AN IMAGE FORMING LAMP

This application is a continuation of application Ser. No. 001,575, filed Jan. 8, 1987, now abandoned.

TECHNICAL FIELD

The instant invention relates to a side mirror of a vehicle.

BACKGROUND ART

Generally, prior art mirror assemblies include a housing which encloses a mirror and the mechanical operations therefor, and means for connecting the housing to an automobile. The mirror may be operable through a push pull mechanism or by electronic means.

Some prior art mirrors include additional means for providing an image on the forwardly facing portion of the housing. For example, the U.S. Pat. Nos. 1,874,027 to Condon, issued Aug. 30, 1932; 2,580,014 to Gazda, issued Dec. 25, 1951; and 2,595,331 to Calihan et al, issued May 6, 1952 all disclose mirror assemblies wherein the mirror assembly is a combined driving mirror, parking and signal device. In each of the signaling devices, an image is formed by a lens shaped in the form of the image mounted on the mirror housing to indicate the signal. For example, the Condon patent discloses a mirror housing including a mirrored panel which is either cut away or silvered to form a desired configuration, such as an arrow. The Gazda patent likewise discloses a housing including a plate of lucite forming an arrow. The Calihan et al patent discloses a combination vision mirror and signaling device including a housing having a central longitudinal portion of a transparent or translucent element and a light source within the housing. In each of the aforementioned prior art patents, an assembly is disclosed wherein the image forming means is the housing per se and a light source is provided within the housing. Whether illuminated or not, the image is shown on the housing.

It is desirable in view of present day styling to provide a mirror housing which is aerodynamically designed and an esthetically pleasing. The present invention provides such an assembly wherein a lighted image is projected through a mirror housing. When not illuminated, the image cannot be detected.

SUMMARY OF THE INVENTION

The present invention provides a mirror assembly including a housing having a translucent portion, mirror means retained by the housing, and illuminating image forming means mounted within the housing and behind the mirror for projecting an image through the translucent portion.

FIGURES IN THE DRAWINGS

An embodiment of a mirror assembly constructed in accordance with the present invention will now be described, by way of example only, with reference to the accompanying drawings in which:

FIG. 1 is the mirror housing having the illuminating image forming means illuminated thereby projecting an image through the housing;

FIG. 2 is a view of the forward face of a mirror housing constructed in accordance with the present invention not illuminated;

FIG. 3 is a cross sectional view of the invention; and

FIG. 4 is a side view partially broken away of a second embodiment of the invention.

DETAILED DESCRIPTION OF THE DRAWINGS

A mirror assembly constructed in accordance with the present invention is generally shown at 10.

The assembly 10 includes a translucent housing generally indicated at 12. The housing is constructed from a translucent material, such as a hard plastic. For example, the housing may be a smoke tinted outside shell which normally appears as a dark plastic cone shaped housing. The housing is aerodynamically designed having a closed forwardly facing portion 14 and an open rearwardly facing portion 16. The housing 12 is connected to an automobile by neck portion 18. Alternative designs may incorporate a housing 12 which is connected directly to the automobile or by other means well known in the art. Additionally, the housing may be a cover mounted over an existing mirror housing.

Mirror means, generally indicated at 20, are retained by the housing 12. The mirror means 20 generally includes an opaque mirrored panel 22 and the mechanical mechanism for operating the mirror schematically shown at 24. Various means well known in the art can be used for operating the mirror 22, such means being either by a mechanical push/pull mechanism or by an electronic mechanism.

The invention is characterized by including illuminating image forming means, generally indicated at 26, mounted within the housing 12 and behind the mirror means 20 for projecting an image through the housing 12. Unlike prior art assemblies wherein a light is disposed within the mirror housing and an image forming means is formed integral with the housing or from the housing, the present invention provides both the illuminator and the image forming means totally housed within the housing. The illuminated image is then projected through the translucent housing 12, as shown in FIG. 2. When the illuminating image forming means 26 is not illuminated, the image forming means 26 is not illuminated, the image is not seen through the housing, and only the darkened housing appears, as in FIG. 2. Hence, there is no indication of the image forming means when not illuminated. The illuminating image forming means 26 is only apparent when illuminated, as shown in FIG. 1.

Where an outer shell is disposed over an existing housing, the illuminating image forming means is disposed between the outer shell and the existing housing.

The illuminated image forming means 26 includes lamp means for illuminating an image, an image forming means for defining the image within the housing 12, and control means schematically indicated at 28 for selectively actuating the lamp means to illuminate the image forming means to project the image through the translucent housing 12.

For example, the illuminating means may include a lamp 30 and the image forming means may include a substantially opaque form 32 disposed between the housing 12 and lamp.

Alternatively, as shown in FIG. 3, the lamp means and the image forming means can include an image shaped lamp member 34. The image shaped lamp member 34 includes an electroluminescent lamp 34. An example of such an electroluminescent lamp is a metal-ceramic electroluminescent lamp manufactured by Secom General Corporation under the trade name PANELIGHT TM. The PANELIGHT is a metallic-ceramic (not plastic) electroluminescent light that can be produced in almost any size, shape, or color. Unlike incandescent and fluorescent lights, PANELIGHT converts electrical energy directly into light without first converting it to heat. The PANELIGHT electroluminescent light is comprised of ceramic coatings on 22 gage steel. Electrical connections are made through the steel base plate and to a transparent conductive layer, and these are separated by ceramic dielectric materials and the electroluminescent phosphor A silver conductor path runs around the edge of the conductive layer. A nonluminesce area results on the path as well as around cutouts, openings, and electrical connection points.

The electroluminescent lamp 34 is mounted on mounting clips 36 and connected to the control means, which is in the form of an inverter 38. Actuation of the inverter, as by a turning signal, back-up lights or other means, will light the lamp 34 and indicate the image from the lamp. Of course, other lamp means may be utilized which likewise form an illuminated image of sufficient density to be seen through the housing shell 12.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A mirror assembly (10) comprising: a translucent housing (12) including a plastic shell being substantially cup shaped and having an open end and a closed end and a wall extending from said closed end, said wall and said closed end and containing and concealing illuminating image forming means within said housing (12) and preventing incident light from passing therethrough while only revealing an illuminated image through at least one of said well and closed end projected from the illuminating image forming means; mirror means (20) retained by said housing (12) within and adjacent to said open end; and said illuminating image forming means (26) mounted within said housing (12) adjacent at least one of said closed end and wall and completely behind said mirror means (20) so as to be hidden from view from outside said housing (12) and said mirror means (20) for projecting only said illuminated image through at least one of said wall and closed end of said shell (12).

2. An assembly as set forth in claim 1 further characterized by said illuminating image forming means (26) including lamp means for illuminating said image and image forming means for defining said image within said housing (12) and control means (28) for selectively actuating said lamp means to illuminate said image forming means to project the image through said translucent housing (12).

3. An assembly as set forth in claim 2 further characterized by said lamp means and said image forming means including an image shaped lamp member (34).

4. An assembly as set forth in claim 3 further characterized by said image shaped lamp member (34) including an electroluminescent lamp (34).

5. An assembly as set forth in claim 1 further characterized by said mirror means including an opaque mirrored member (22) and mirror mounting means (24) for mounting and operating said mirrored member (22) within said housing (12).

6. An assembly as set forth in claim 5 further characterized by including connecting means (18) for connecting said housing (12) to an automobile body.

7. An assembly as set forth in claim 6 further characterized by said connecting means including a neck portion (18) extending from said housing (12).

* * * * *